Nov. 23, 1965
E. A. HORN
3,218,771
APPARATUS FOR INSTALLING SHEET INSULATION
IN INDUSTRIAL-TYPE BUILDINGS
Filed Oct. 3, 1963
2 Sheets-Sheet 1
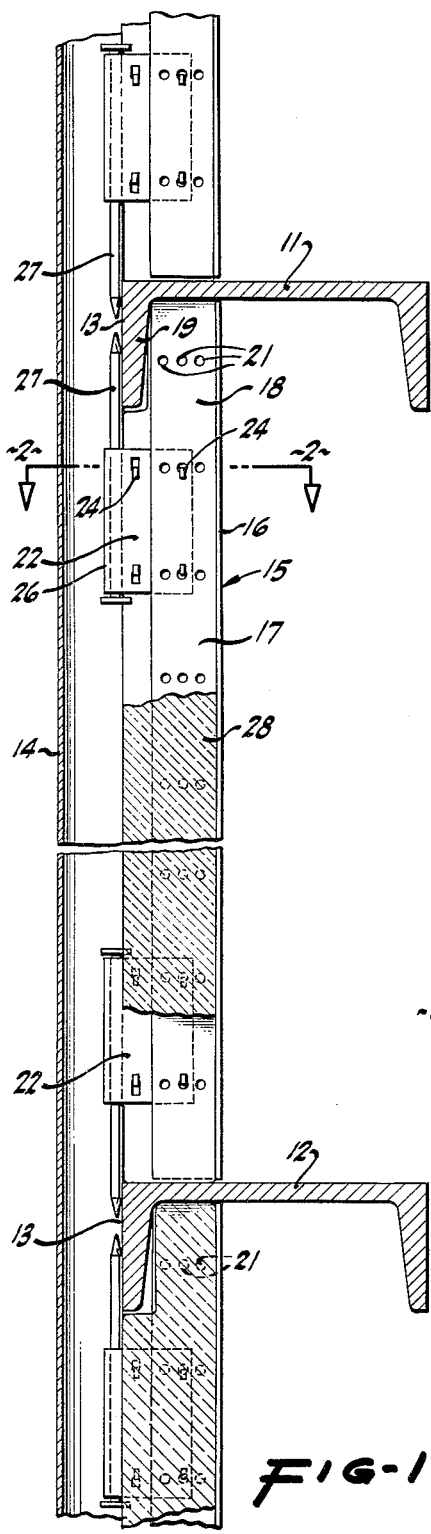
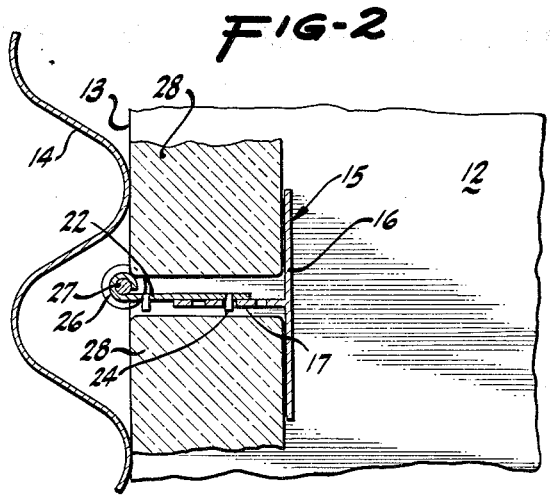
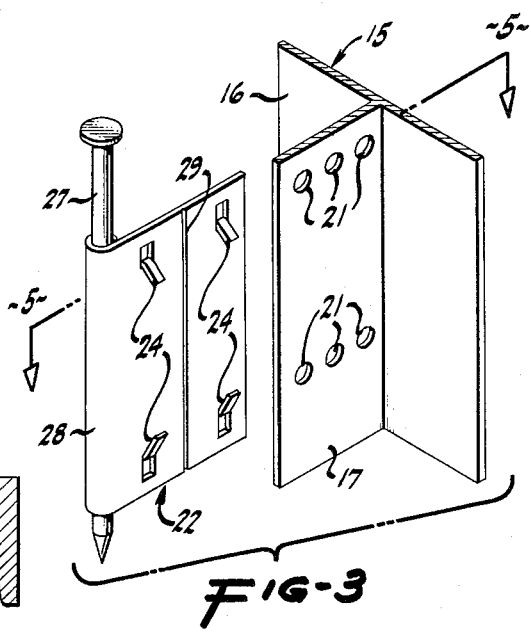
INVENTOR.
ERWIN A. HORN
BY
Mellin and Hanscom
ATTORNEYS

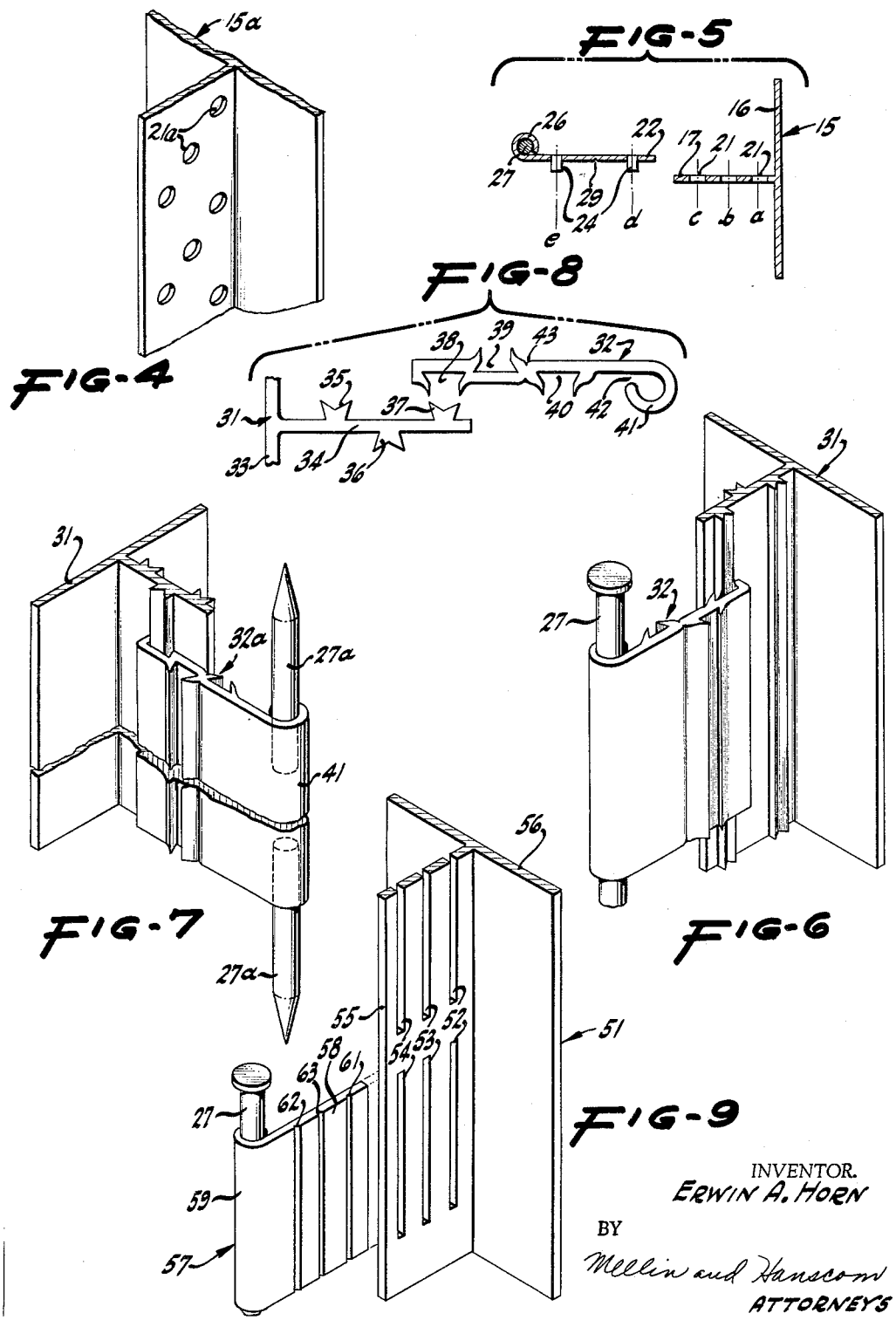

United States Patent Office 3,218,771
Patented Nov. 23, 1965

3,218,771
APPARATUS FOR INSTALLING SHEET INSULA-
TION IN INDUSTRIAL-TYPE BUILDINGS
Erwin A. Horn, 151 W. Haven Ave., Arcadia, Calif.
Filed Oct. 3, 1963, Ser. No. 313,486
15 Claims. (Cl. 52—479)

This invention relates to building construction, and more particularly to devices for installing rigid sheet material, such as insulation interiorly against the walls and roofs of industrial-type buildings.

In general, the apparatus of the present invention finds utility in buildings that are constructed of a framework of steel structural members such as channels, I-beams, H-beams or the like to which a corrugated metal siding and/or roof is secured, the invention being practiced to apply sheet insulating material to the inside of the siding or the roof. The insulating material is disposed flat against the siding or roof, between the structural members and the principal object of the invention is in the provision of improved means to hold the insulating material easily and securely in place.

Although various methods of attaching the insulating material in place have been suggested, at the present time only two methods are used commercially. The first method utilizes a spindle-type attachment consisting of a sharpened piece of wire about a quarter- or half-inch longer than the insulation thickness, welded to a small rectangular perforated metal base plate. The metal plates are then attached to the siding with an adhesive at about twelve-inch centers. After the adhesive has set, the insulation sheet is impaled on the wires and held in place by special metal washers referred to as "speed nuts."

This method has several defects. First, the method is relatively expensive and time-consuming. Second, the appearance of the round, thin metal washers on the face of the finished insulation job is not desirable in many installations. Third, the joints in the insulation are butt jointed and exposed, which shows up the damage to the edges of the sheets that often occurs in handling. Fourth, the pins are sometimes bent over before or during the installation of the insulating material, such that they do not impale the insulating material.

The second commonly used method employs a T-shaped metal bar of thin metal to hold the insulation in place. In this method the sheet insulation is installed in place, and the leg of the T-bar is inserted in the crack between adjacent insulation sheets. The face of the T-bar is exposed and holds and covers the joints between the insulation sheets. The principal problem in this method is in the securing of the T-bars to the structural members of the building. If a steel T-bar is used, it can be welded at its ends to the structural members after the insulation is in place. This requires the T-bars to be accurately cut to length so as to engage at both ends the structural members. Also, since the welding must be done by the relatively highly paid members of the sheet metal workers unions, they must also apply the insulation, as it cannot be temporarily secured in place ahead of the T-bars. Welding burns off the prime paint coat on the structural members and must be touched up after welding. Another drawback of this method is that the finished insulation becomes soiled from handling by welders who cannot handle steel and keep their hands clean.

Another manner of attaching the T-bars is by drilling holes in the leg section of the T-bars at each end and bolting on small angle clips. One of the holes must be slotted for vertical adjustment. The insulation is then installed progressively by putting up a sheet of insulation, fitting a T-bar with angle fasteners attached, making holes for bolting other angle clips thereto, drilling holes in the structural members and then bolting the whole assembly together. Such a method involves quite high labor costs, but sometimes must be used, especially if an aluminum T-bar is used, since aluminum cannot be welded to steel.

Still another method of attaching the T-bars is to have the insulating material installed from outside of the building before the siding is put in place. If steel T-bars are used, it is then relatively easy to weld them in place in advance of either the insulation or siding. If aluminum T-bars are used, they can be installed with a relatively simple sheet metal clip. This method also has several disadvantages. It is difficult to work insulation under adverse weather conditions, particularly wind or rain. The workmen still damage and soil the finished faces, and the workmen installing the insulation command the highest wages in the building industry.

The object of the present invention is to provide apparatus whereby the T-bars may be quickly and inexpensively secured in place after the siding has been installed without permanent attachment of the T-bars to the structural members which otherwise would require welding or drilling by highly paid union craftsmen.

A further object of the invention is to provide insulation-holding devices that are easily and cheaply adjustable to accommodate the variety of thicknesses in which sheet insulation is manufactured.

Other objects and advantages will become apparent in the course of the following detailed description.

In the drawings, forming a part of this application, and in which like parts are designated by like reference numerals throughout the same, FIG. 1 is a sectional view in elevation showing the structural members and siding of a building with sheet insulation held in place by T-bars in accordance with the invention, portions of the insulation sheet being broken away.

FIG. 2 is a sectional view of FIG. 1, taken on line 2—2 thereof.

FIG. 3 is an exploded perspective view of the T-bar and clip arrangement of FIG. 1.

FIG. 4 is a perspective view of a modification of the T-bar of FIG. 1.

FIG. 5 is a sectional view of the T-bar and clip of FIG. 3, taken on line 5—5 thereof, illustrating the spacing of the connection means thereof.

FIG. 6 is a perspective view of a modified T-bar and clip.

FIG. 7 is a perspective view of yet another modification of T-bar and clip.

FIG. 8 is an end view of the T-bar and clip of FIGS. 6 and 7 illustrating the details thereof and the spacing of the connection means.

FIG. 9 is an exploded perspective view of yet another modification of a T-bar and clip usable in the invention.

Referring now to the drawings, FIGS. 1 and 2 show a building wall conventionally constructed with parallel steel structural members 11 and 12, each having a surface 13 that is coplanar with the other. In FIG. 1, the structural members 11 and 12 are shown as C-channels, but H-beams, I-beams, or other such members may be used. The metal siding 14 extends between the structural members and is secured and flush with the surfaces 13 by conventional means. The metal siding 14 is shown as corrugated, although other forms may be employed as long as there are sufficient gaps between the inner surface of the siding and the structural member surfaces 13 to allow the invention to be practiced.

An elongated T-bar 15, having a head 16 parallel to the structural member surfaces 13, and a leg 17 extending from the head towards the siding 14, extends vertically between the structural members 11 and 12. If necessary, the upper portion 18 of the leg 17 may be cut away if the flange 19 of structural member 11 interferes with the proper placement of the T-bar. The leg 17 of the T-bar is perforated, as at 21, at vertically spaced intervals along lines parallel to the head 16.

Identical clips 22, having punched-out ears 24, are connected to the leg of the T-bar 15 at each end adjacent the structural members 11 and 12. The connection is made by inserting appropriate ears 24 of the clips through appropriate holes 21 in the T-bar leg and clenching the ears over. Preferably, the ears are clenched over in opposite directions to provide a good mechanical connection with the T-bar.

The clips 22 have their outer edge formed into a sleeve 26 of an inner diameter approximately the same as the outer diameter of pins 27, which fit tightly therein but which may slide axially in the sleeve upon being struck upon their ends by a hammer or similar tool.

The sheet insulation 28 extends vertically between the structural members 11 and 12 and horizontally between the innermost portion of siding 14 and the head 16 of the T-bars 15. As is seen in FIG. 2, the head 16 of the T-bars engages and holds two adjacent sheets of insulation at the joint therebetween.

The insulation sheeting 28 is available commercially in various standard thicknesses varying in quarter-inch increments, and one of the important features of the invention is the ability of the T-bar and clips to accommodate a wide range of thicknesses. Referring to FIGS. 3 and 5, the holes 21 in the leg of the T-bar 15 are formed along lines *a*, *b* and *c* parallel to the head 16 of the T-bar. In the preferred embodiment of the T-bar, the spacing between the head and line *a* is ³⁄₁₆ of an inch, and the spacing between lines *a* and *b* and between lines *b* and *c* is ¼ of an inch. The ears 24 of clip 22 are formed in vertical pairs along lines *d* and *e* spaced parallel to the clip sleeve 26. The spacing between lines *d* and *e* is ¾ inch and the spacing between line *e* and the closest inner surface of sleeve 26, i.e., the closest surface of pin 27, is ¹⁄₁₆ inch. The clip has a scored break line 29 formed between lines *d* and *e*.

If the ears 24 on line *d* of the clip are inserted in the holes 21 along line *c* of the T-bar, the spacing between the T-bar head 16 and pin 27 is 1½ inches to accommodate insulation sheets of that thickness. The connection of ears *d* to holes *b* or *a* will accommodate insulation sheets of 1¼ or 1 inch, respectively. To accommodate thinner sheets of insulation, the clip 22 is broken away at break line 29, and the ears 24 along line *e* are connected to the T-bar holes along lines *c*, *b* or *a* to provide for insulation thicknesses of ¾, ½ or ¼ inch, respectively.

The holes 21 of the T-bar leg are formed throughout the length of the T-bar so that any length T-bar may be cut from longer stock lengths, and the vertical spacing between adjacent holes is, of course, the same as the vertical spacing between ears 24 of the clip. Preferably, this spacing is 1½ inches or less so that the end of the clip, which is preferably 2 inches in height, that is farthest removed from the structural member 11 or 12 is never more than 3¼-inch, regardless of where the T-bar may be cut, to enable a 16-penny nail to be used as pin 27 with sufficient engagement of the structural member 11 or 12.

The sleeve 26, formed on the end of the clip 22, has an internal diameter of such size as to provide a tight frictional fit with pin 27. If the pin is undersize, the sleeve can be crimped by a pair of pliers to insure proper locking.

To insulate a building, the T-bars are cut to length to fit vertically between the structural members 11 and 12, and clips 22 are connected to each end of the T-bar, with the proper ears 24 mated to holes 21 in accordance with the thickness of the insulating sheets to be applied. The ears which project through the holes are bent over and clenched. If desired, one of the pins 27 may be permanently fixed with its point extending to engage the vertical surface 13 of one of the structural members. The T-bar may then be installed by angling it into position with the fixed pin inserted into the open space between the structural member and the siding 14, and the other end positioned in place where it may be secured against withdrawal by moving the movable pin vertically to lock the T-bar, through the pin and clip, against removal by any force exerted against the back of the insulation.

In the installation, a sheet of insulation is placed flush against the siding, preferably at a corner of the building, and a T-bar is inserted and locked in the position shown in FIGS. 1 and 2. The operation is repeated until all of the insulation is in place between the structural members 11 and 12, or until the workmen reach the end of the scaffolding. If the latter is the case, the scaffold is raised, and the operation is repeated to insulate another floor of the building.

The above procedure may be varied by using pins in both clips that are vertically movable, in which case the T-bar assembly is locked in place by having both pins in a retracted position until the assembly is positioned. Then the upper pin is hammered upwardly and the lower pin is hammered downwardly for locking.

If desired, the sleeve 26 on clips 22 could be slightly inclined relative to the ears 24 so that the pins will exert a wedging action on the structural members 11 and 12 to pull the T-bar head tightly against the face of the insulation sheeting.

FIG. 4 illustrates a variation 15*a* of the T-bar wherein the holes 21*a* of each vertical line are staggered relative to each other, as it may be desirable at times not to have all of the holes 21*a* of each line lie on the same horizontal line. This T-bar is used in exactly the same manner as above described.

FIGS. 6 and 8 illustrate a further embodiment of the invention utilizing aluminum extrusions for the T-bar 31 and clip 32. In this form, the T-bar 31 is extruded through a suitable die to form the head 33 and leg 34 with dovetail ribs 35, 36 and 37 formed alternately on opposite sides of the leg and parallel to the head 33. The clip 32 is extruded with dovetail grooves 38, 39 and 40 formed alternately into opposite sides of the clip, parallel to sleeve 41. The extremity of the clip forming the sleeve 41 does not touch the body of the clip, but is spaced therefrom to form a slit 42 lengthwise of the clip. The clip has a break line 43 formed between grooves 39 and 40.

In a preferred form of this embodiment, the T-bar ribs 35, 36 and 37 are spaced at quarter-inch intervals from the T-bar head 33, and the clip grooves 40, 39 and 38 are spaced at quarter-inch intervals starting from the closest point of the inside of sleeve 41.

Various thicknesses of insulation can be accommodated as follows: If rib 37 is received in groove 38, the spacing between the T-bar head 33 and the pin held in sleeve 41 will be 1½ inches. With rib 37 in groove 39, the spacing will be 1¼ inches. With rib 35 in groove 38 and rib 37 in groove 40, the spacing will be one inch. If desired, the clip can be broken at break line 43 and rib 37 inserted into groove 40 to obtain a one-inch spacing. With the clip broken at break line 43, ribs 36 and 35 can be alternately disposed in groove 40 to obtain spacings of ¾ or ½ inch, respectively.

The dovetail ribs can be locked or clenched in the dovetail grooves by pressure rolling or by a hammer-and-anvil method. Since the stresses involved are relatively low, spot-locking by single hammer blows will be sufficient in most cases to provide sufficient clenching.

The connected-together T-bar and clip of FIG. 6 is used in the same manner as previously described to install sheet insulation.

In some instances the distance between structural members 11 and 12 may be sufficiently great that the extruded T-bar 31 may not be of a proper stiffness. In such case, the modified clip 32a of FIG. 7 should be used, wherein the clip is approximately the same length as the T-bar. Then, when the appropriate dovetail rib of the T-bar is locked in a dovetail groove of the clip 32a, the clip will rigidify the entire length of the T-bar against flexure. The clip 32a may be locked to the T-bar by pressure-rolling or spot-hammering.

If the full-length clip 32a is used, headless locking pins 27a are required. In this case the pin at one end would be partially driven into the open end of the sleeve 41 and left projecting a sufficient distance to engage the structural member 11 or 12. In the opposite end, the pin 27a would be driven completely into the sleeve, leaving the outward end of the pin flush with the end of the sleeve. To lock the assembly in place to hold the insulation, the T-bar is brought into position with the projected pin behind one of the structural members 11 or 12, and the other pin in position to be driven behind the other structural member. A thin piece of metal strip is inserted into slit 42 and into contact with the end of the retracted pin. A light hammer blow on the metal strip will then drive the pin into locking position.

The pins 27a will have a tight friction fit with the sleeve 41 so that they can be moved only by driving. In the event that a pin is undersized, the sleeve can be crimped by a pair of pliers to give the necessary tight fit.

The sleeve slit 42 may be on either the right or left side of the workman, as it is not necessary to install a T-bar and then a sheet of insulation alternately, because the T-bars are not rigidly fixed to the structural members 11 and 12, and may be moved either right or left of a predetermined point by the width of the open portion of the siding between points of engagement of the siding with the structural members 11 and 12. Also, the T-bar assembly may be rocked to the right or left, using the point where the locking pins 27a contact the structural members 11 and 12 as a pivot point. This permits installation of all of the T-bar assemblies before any of the sheet insulation is applied, if desired.

Although the form of the invention shown in FIGS 6-8 illustrates the dovetail ribs as being formed in the leg of the T-bar and the dovetail grooves as being formed in the clip, it is to be realized that instead the ribs could be formed on the clip and the grooves formed in the T-bar, if desired, as the interconnection would be the same.

The form of the invention shown in FIG. 7 has yet another advantage in that several lengths of T-bar 31 may be joined together by one or more lengths of the elongated clip 32a, as long as the joints therebetween are staggered.

FIG. 9 illustrates still another form of the invention, wherein the T-bar 51 is provided with vertical slots 52, 53 and 54 in the leg 55 parallel to the head 56. The clip 57 has a tongue 58 extending from sleeve 59 which is provided with fold lines 61 and 62, with a break line 63 therebetween. The tongue may be folded at line 61, inserted through an appropriate slot, doubled back upon itself and clenched to accommodate a variety of insulation thicknesses. To extend the range, the clip may be broken at break line 63, folded at 62, inserted through one of the slots, doubled back upon itself and clenched.

It is to be understood that the various forms of the invention herewith shown and described are to be taken as preferred embodiments of the same, and that various changes may be made in the shape, size and arrangement of the same without departing from the spirit of the invention or the scope of the attached claims.

Having thus described my invention, what I claim is:

1. Apparatus for use in a building construction, comprising:
    an elongated T-bar having a head and a leg, there being a line of joinder between said head and leg which extends the length of said T-bar;
    sleeve means connected to said leg and having portions thereof adjacent each end of said T-bar leg, said sleeve means portions being generally parallel to said line of joinder of said T-bar head and leg;
    pin means disposed in and extending from each portion of said sleeve means adjacent an end of said T-bar leg, at least one pin means being frictionally slidable in its respective sleeve means portion.

2. Apparatus for use in a building construction, comprising:
    an elongated T-bar having a head and a leg;
    said T-bar leg having a plurality of connection means extending the length of said leg along parallel lines spaced at predetermined distances from said head;
    clip means disposed parallel to said T-bar leg and having portions adjacent the ends of said T-bar;
    sleeve means formed along an edge of said clip means generally parallel to said T-bar head and having portions adjacent to both ends of said T-bar leg;
    pin means disposed in and extending from each portion of said sleeve means adjacent an end of said T-bar leg, at least one pin means being frictionally slidable in its respective sleeve means portion;
    said clip means having a plurality of connection means disposed at predetermined spaced distances from said sleeve means;
    said connection means of said clip means and T-bar being interconnected so that said T-bar head is spaced from said pin means a predetermined desired distance.

3. Apparatus for use in a building construction as set forth in claim 2, wherein:
    said connection means on said T-bar leg comprises a plurality of dovetail ribs formed on said leg parallel to said T-bar head;
    said connection means on said clip means comprises a plurality of dovetail grooves formed into said clip means and parallel to said sleeve;
    one of said dovetail ribs being clenched into tight engagement with one of said grooves.

4. Apparatus for use in a building construction as set forth in claim 3, wherein:
    said dovetail ribs extend the full length of said T-bar;
    said clip means extends substantially the full length of said T-bar and said dovetail grooves extend the full length of said clip means; and
    said clip means sleeve is provided with a slit lengthwise thereof.

5. Apparatus for use in a building construction as set forth in claim 2, wherein:
    said connection means on said T-bar leg comprises a plurality of dovetail ribs formed alternately on opposite sides of said leg parallel to said T-bar head;
    said connection means on said clip means comprises a plurality of dovetail grooves formed alternately into opposite sides of said clip means and parallel to said sleeve;
    said clip means having a break line parallel to and between said grooves;
    one of said dovetail ribs being clenched into tight engagement with one of said grooves.

6. Apparatus for use in a building construction as set forth in claim 2, wherein:
    said connection means on said T-bar leg comprises a plurality of holes through said leg spaced along lines parallel to said T-bar head;

said connection means on said clip means comprises a plurality of ears extending from said clip means and spaced along lines parallel to said sleeve;

said clip means having a break line parallel to and between said lines of ears;

preselected ones of said ears being received into preselected ones of said holes and being clenched into tight engagement of said clip means with said T-bar leg.

7. Apparatus for use in a building construction as set forth in claim 2, wherein:

said connection means on said T-bar leg comprises a plurality of elongated slots through said leg parallel to said T-bar head;

said connection means on said clip means comprises a tongue extending from said sleeve and inserted through a preselected one of said slots and clenched to said leg, said tongue having a plurality of spaced fold lines thereon parallel to said sleeve and a break line intermediate said folded lines.

8. A building construction comprising:

two parallel structural channel members, each having a surface coplanar with the other;

a siding extending between and disposed against said channel member surfaces;

a T-bar extending between said channel members with the head of the T parallel to said channel member surfaces and the leg of the T extending from said head towards said siding;

sleeve means connected to said T-bar leg, said sleeve means being generally parallel to said T-bar head and having portions adjacent to both ends of said T-bar leg;

pin means disposed in and extending from each portion of said sleeve means adjacent an end of said T-bar leg, said pin means being in engagement with said channel member surfaces, at least one pin means being frictionally slidable in its respective sleeve means portion;

a sheet of material extending between said channel members and disposed between said channel member surfaces and said T-bar head;

said sleeve and T-bar head being spaced apart such that said T-bar head is spaced from said channel member surfaces a distance equal to the thickness of said material sheet.

9. A building construction, comprising:

two parallel structural channel members, each having a surface coplanar with the other;

a siding extending between and disposed against said channel member surfaces;

a T-bar extending between said channel members with the head of the T parallel to said channel member surfaces and the leg of the T extending from said head towards said siding;

clip means disposed parallel to said T-bar leg and having portions adjacent each of said channel members;

sleeve means formed along an edge of said clip means generally perpendicular to said channel members and having portions adjacent to both ends of said T-bar leg;

pin means disposed in and extending from each portion of said sleeve means adjacent an end of said T-bar leg, said pin means being in engagement with said channel member surfaces, at least one pin means being frictionally slidable in its respective sleeve means portion;

a sheet of material extending between said channel members and disposed between said channel member surfaces and said T-bar head;

said clip means and T-bar being interconnected with said T-bar head spaced from said channel member surfaces a distance substantially equal to the thickness of said material sheet.

10. A building construction, comprising:

two parallel structural channel members, each having a surface coplanar with the other;

a siding extending between and disposed against said channel member surfaces;

a T-bar extending between said channel members with the head of the T parallel to said channel member surfaces and the leg of the T extending from said head towards said siding;

said T-bar leg havng a plualty of connecton means extending the length of said leg along parallel lines spaced at predetermined distances from said head;

clip means disposed parallel to said T-bar leg and having portions adjacent each of said channel members;

sleeve means formed along an edge of said clip means generally perpendicular to said channel members and having portions adjacent to both ends of said T-bar leg;

pin means disposed in and extending from each portion of said sleeve means adjacent an end of said T-bar leg, said pin means being in engagement with said channel member surfaces, at least one pin means being frictionally slidable in its respective sleeve means portion;

said clip means having a plurality of connection means disposed at predetermined spaced distances from said sleeve means; a sheet of material extending between said channel members and disposed between said channel member surfaces and said T-bar head;

said connection means of said clip means and T-bar being interconnected with said T-bar head spaced from said channel member surfaces a distance substantially equal to the thickness of said material sheet.

11. A building construction as set forth in claim 10, wherein:

said connection means on said T-bar leg comprises a plurality of dovetail ribs formed on said leg parallel to said T-bar head;

said connection means on said clip means comprises a plurality of dovetail grooves formed into said clip means and parallel to said sleeve;

one of said dovetail ribs being clenched into tight engagement with one of said grooves.

12. A building construction as set forth in claim 11, wherein:

said dovetail ribs extend the full length of said T-bar;

said clip means extends substantially the full length of said T-bar and said dovetail grooves extend the full length of said clip means; and said clip means sleeve is provided with a slit lengthwise thereof.

13. A building construction as set forth in claim 10, wherein:

said connection means on said T-bar leg comprises a plurality of dovetail ribs formed alternately on opposite sides of said leg parallel to said T-bar head;

said connection means on said clip means comprises a plurality of dovetail grooves formed alternately into opposite sides of said clip means and parallel to said sleeve;

said clip means having a break line parallel to and between said grooves;

one of said dovetail ribs being clenched into tight engagement with one of said grooves.

14. A building construction as set forth in claim 10, wherein:

said connection means on said T-bar leg comprises a plurality of holes through said leg spaced along lines parallel to said T-bar head;

said connection means on said clip means comprises a plurality of ears extending from said clip means and spaced along lines parallel to said sleeve;

said clip means having a break line parallel to and between said lines of ears;

preselected ones of said ears being received into preselected ones of said holes and being clenched into tight engagement of said clip means with said T-bar leg.

15. A building construction as set forth in claim 10, wherein:
    said connection means on said T-bar leg comprises a plurality of elongated slots through said leg parallel to said T-bar head;
    said connection means on said clip means comprises a tongue extending from said sleeve and inserted through a preselected one of said slots and clenched to said leg, said tongue having a plurality of spaced fold lines thereon parallel to said sleeve and a break line intermediate said fold lines.

References Cited by the Examiner
UNITED STATES PATENTS

| | | | |
|---|---|---|---|
| 1,082,336 | 12/1913 | Jester | 52—355 |
| 2,999,277 | 9/1961 | Spencer et al. | 52—479 |

FRANK L. ABBOTT, *Primary Examiner.*

RICHARD W. COOKE, JR., *Examiner.*